United States Patent
Wloka

(10) Patent No.: US 11,649,774 B2
(45) Date of Patent: *May 16, 2023

(54) FUEL INJECTOR OF A DUAL-FUEL INTERNAL COMBUSTION ENGINE AND DUAL-FUEL INTERNAL COMBUSTION ENGINE

(71) Applicant: MAN Energy Solutions SE, Augsburg (DE)

(72) Inventor: Johann Wloka, Munich (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,005

(22) Filed: Jun. 24, 2021

(65) Prior Publication Data
US 2021/0404394 A1 Dec. 30, 2021

(30) Foreign Application Priority Data
Jun. 25, 2020 (DE) .......................... 10 2020 116 707

(51) Int. Cl.
*F02D 19/06* (2006.01)
*F02M 37/00* (2006.01)
(Continued)

(52) U.S. Cl.
CPC ..... *F02D 19/0694* (2013.01); *F02D 19/0689* (2013.01); *F02M 37/0023* (2013.01);
(Continued)

(58) Field of Classification Search
CPC ............. F02D 19/0642; F02D 19/0647; F02D 19/0692; F02D 41/0025
(Continued)

(56) References Cited

U.S. PATENT DOCUMENTS 6,067,964 A * 5/2000 Ruoff ................... F02M 47/027
123/585
2010/0199948 A1* 8/2010 Rogak ................. F02D 19/0689
123/304

(Continued)

FOREIGN PATENT DOCUMENTS

DE       102013002758       8/2014
DE    10 2017 123 315       10/2017
(Continued)

OTHER PUBLICATIONS

Search Report dated Nov. 1, 2021 issued in European Patent Application No. 21181608.

(Continued)

*Primary Examiner* — John Kwon
(74) *Attorney, Agent, or Firm* — Cozen O'Connor

(57) ABSTRACT

A fuel injector feeds fuel to a combustion chamber of a cylinder of a dual-fuel engine and includes: a main body having a needle guide; a nozzle needle guidable in the needle guide; a needle fuel chamber defined by the main body, coupleable to the combustion chamber, wherein the orifices are open in a first position of the nozzle needle and closed in a second position of the nozzle needle; a first line arranged in the main body, and being coupled to the needle fuel chamber, via the first line a fuel being introduceable into the needle fuel chamber. In the main body a second line is coupleable to the needle guide and to a control chamber of a control valve of the fuel injector, wherein via the second line a fuel is feedable to the needle guide as barrier fluid and to the control chamber as working fluid.

10 Claims, 3 Drawing Sheets

(51) Int. Cl.
*F02M 37/04* (2006.01)
*F02M 61/10* (2006.01)

(52) U.S. Cl.
CPC ........ *F02M 37/0088* (2013.01); *F02M 37/04* (2013.01); *F02M 61/10* (2013.01)

(58) Field of Classification Search
USPC .................................................. 123/525–527
See application file for complete search history.

(56) References Cited

U.S. PATENT DOCUMENTS

| | | |
|---|---|---|
| 2013/0081593 A1 | 4/2013 | Coldren |
| 2013/0092130 A1 | 4/2013 | Kylstroem |
| 2014/0373806 A1* | 12/2014 | Hou ..................... F02M 59/105 123/294 |
| 2015/0144710 A1* | 5/2015 | Graham ............. F02M 63/0014 239/584 |
| 2016/0123286 A1* | 5/2016 | Hou ..................... F02M 45/086 123/304 |

FOREIGN PATENT DOCUMENTS

| | | |
|---|---|---|
| DE | 102016216608 | 3/2018 |
| WO | WO 2013/086427 | 6/2013 |

OTHER PUBLICATIONS

Office Action dated Feb. 1, 2021 issued in German Patent application No. 102020116707.5.

* cited by examiner

FUEL INJECTOR OF A DUAL-FUEL INTERNAL COMBUSTION ENGINE AND DUAL-FUEL INTERNAL COMBUSTION ENGINE

BACKGROUND OF THE INVENTION

1. Field of the Invention

The invention relates to a fuel injector of a dual-fuel internal combustion engine. The invention furthermore relates to a dual-fuel internal combustion engine.

2. Description of the Related Art

The invention present here relates in particular to the field of so-called large engines or large internal combustion engines, whose cylinders have piston diameters of at least 140 mm, in particular of at least 175 mm. Such large internal combustion engines are, for example, marine engines.

Dual-fuel internal combustion engines as marine engines are already known. Dual-fuel internal combustion engines known from practice can be operated in a first operating mode, in which the engine combusts a liquid fuel, and in a second operating mode, in which the engine combusts a gaseous fuel or another liquid fuel.

From DE 10 2017 123 315 A1 a dual-fuel internal combustion engine having a dual-fuel injector is known. Each fuel is delivered via a separate fuel pump in the direction of the dual-fuel injector. Furthermore, there is a separate sealing and lubricating oil system.

SUMMARY OF THE INVENTION

Starting out from this, an object of the present invention is to create a new type of fuel injector of a dual-fuel internal combustion engine and a dual-fuel internal combustion engine having such a fuel injector.

This object may be achieved by a fuel injector configured to feed liquid fuel to a combustion chamber of a cylinder of the dual-fuel internal combustion engine. The fuel injector comprises a main body, a nozzle needle movably guided in a needle guide of the main body and a needle fuel chamber defined by the main body, which, via orifices, can be coupled to the combustion chamber, wherein the orifices are open in a first position of the nozzle needle and closed in a second position of the nozzle needle.

In the main body of the fuel injector, a first line is introduced, which is coupled to the needle fuel chamber, wherein via the first line a liquid fuel can be introduced into the needle fuel chamber.

Furthermore, a second line, separate from the first line, is introduced into the main body of the fuel injector, which, on the one hand, is coupled to the needle guide and, on the other hand, to a control chamber of a control valve of the fuel injector, wherein via the second line a liquid fuel can be fed to the needle guide as barrier fluid and to the control chamber as working fluid.

The fuel injector according to an aspect of the invention allows a particularly advantageous fuel injection into the combustion chamber of a respective cylinder of a dual-fuel internal combustion engine that combusts liquid fuels. In an operating mode of the dual-fuel internal combustion engine, a fuel can be injected via the fuel injector into the combustion chamber of the respective cylinder, wherein in this operating mode preferentially another fuel, which is to be introduced into the respective combustion chamber of the respective cylinder in another operating mode, serves as barrier fluid and working fluid. This allows a particularly simple construction of the fuel injector.

According to a further development, the fuel injector is a dual-fuel injector, wherein in a first operating mode of the dual-fuel internal combustion engine a relatively highly ignitable fuel can be fed to the first line and the second line each, and wherein in a second operating mode of the dual-fuel internal combustion engine the first fuel can be fed to the second line and a second relatively less-ignitable fuel to the first line. Such a dual-fuel injector is particularly preferred and allows a particularly simple construction of a dual-fuel internal combustion engine.

According to a further development of the invention, the second line is coupled to the control chamber of the control valve via a choke. This is preferred in order to feed the respective fuel to the control chamber of the control valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

Preferred further developments of the invention are obtained from the following description. Exemplary embodiments of the invention are explained in more detail by way of the drawings without being restricted to this. In the drawings.

DETAILED DESCRIPTION OF THE PRESENTLY PREFERRED EMBODIMENTS

Figure 1:
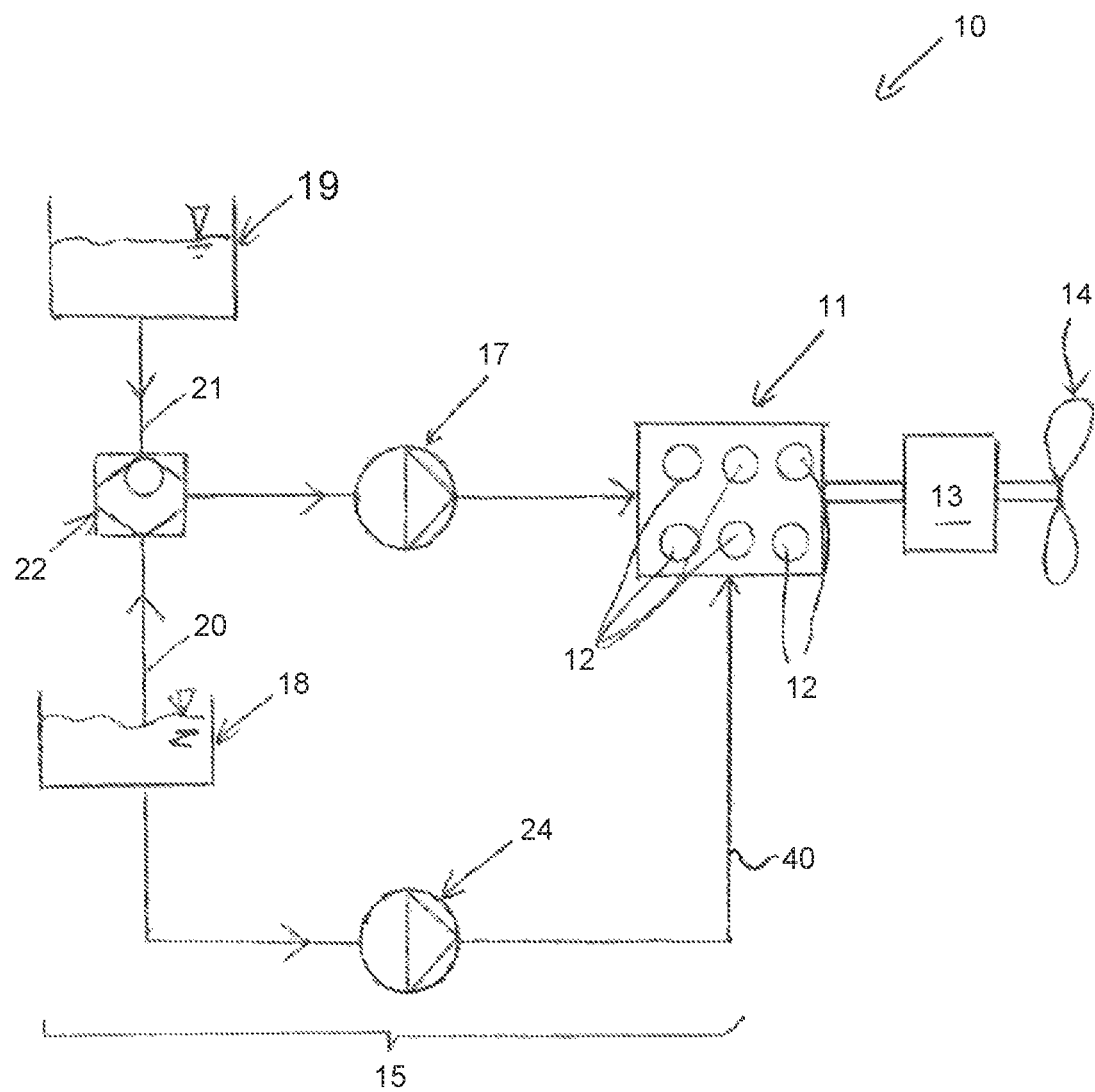
FIG. 1: is a diagram of a ship propulsion system with a dual-fuel internal combustion engine.

FIG. 1 shows, in a highly schematic manner, a ship propulsion system 10, which comprises a dual-fuel internal combustion engine 11 having multiple cylinders 12.

In the cylinders 12, fuel is combusted, namely in a first operating mode of the dual-fuel internal combustion engine 11 a first liquid fuel is combusted and in a second operating mode of the dual-fuel internal combustion engine 11 a second liquid fuel is combusted. During the combustion of the respective fuel the dual-fuel internal combustion engine 11 generates drive power, which is utilized in FIG. 1 in order to drive a generator 13. In the generator 13, electric energy is generated, which drives a ship propeller 14.

Figure 2:
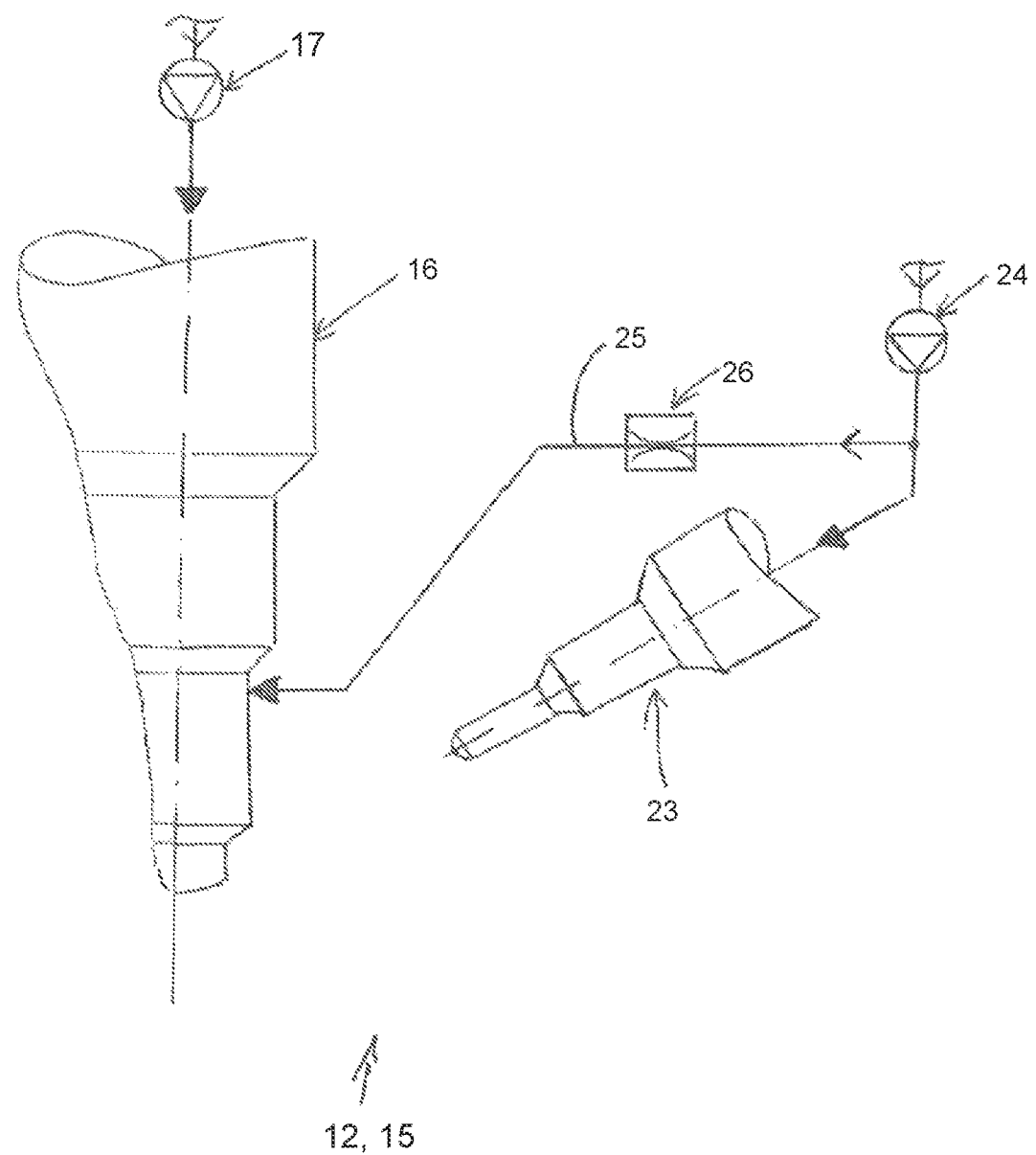
FIG. 2 is an extract from the dual-fuel internal combustion engine in the region of a cylinder.
Figure 3:
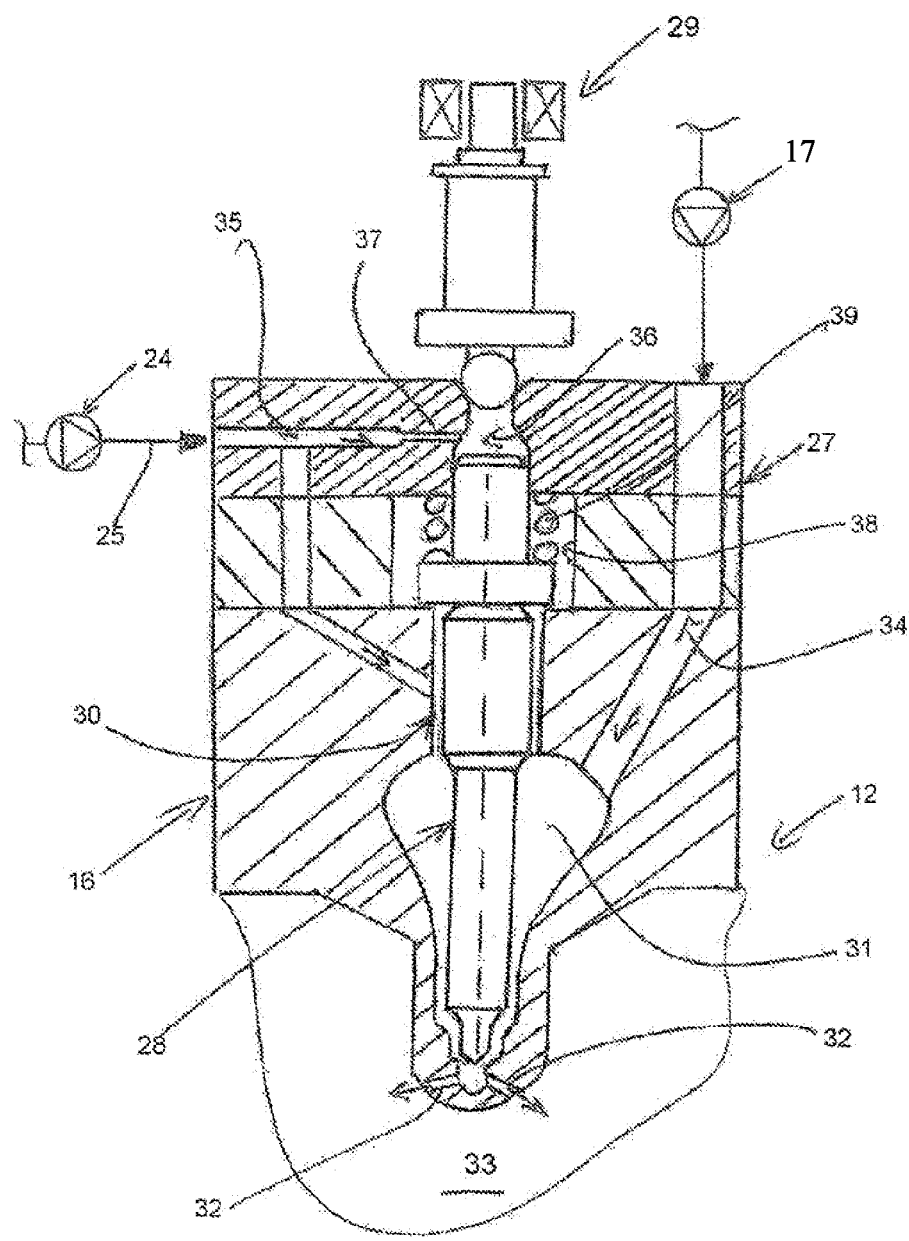
FIG. 3 is a cross section through a fuel injector of the dual-fuel internal combustion engine.

FIG. 1 shows, furthermore, a fuel supply system 15 of the dual-fuel internal combustion engine 11. FIGS. 2 and 3 show further assemblies of the fuel supply system 15. The fuel supply system 15, permits the respective liquid fuel to be fed to the cylinders 12 of the dual-fuel internal combustion engine 11 in the respective operating mode of the engine 11.

The fuel supply system 15 of the dual-fuel internal combustion engine 11 comprises a main injection system and a pilot injection system.

By the main injection system, which for each cylinder 12 comprises at least one main injector 16 (see FIGS. 2, 3), the first liquid fuel, which is relatively highly ignitable, can be fed to the cylinders 12 in the first operating mode and the second liquid fuel, which is relatively less-ignitable in the second operating mode. By this main injector 16, the first liquid fuel can be injected into the respective cylinder 12 in the first operating mode and the second liquid fuel into the cylinder 12 in the second operating mode. Although it is preferred for cost reasons to inject in the first operating mode the first liquid fuel and in the second operating mode the second liquid fuel into the respective cylinder 12 of the dual-fuel internal combustion engine via the same main injector 16, it is alternatively also possible that each cylinder 12 has a separate main injector for each of the two liquid fuels.

In the illustrated embodiment, the same main injector 16 is preferably utilized in the first operating mode for injecting the first liquid fuel and in the second operating mode for injecting the second liquid fuel into the cylinder.

According to FIG. 2, the respective liquid fuel can be fed to the respective main injector 16 via a main pump 17, which accordingly delivers the first liquid fuel in the first operating mode and the second liquid fuel in the second operating mode in the direction of the respective main injector 16.

FIG. 1 shows a first fuel tank 18 for holding the first liquid fuel and a second fuel tank 19 for holding the second liquid fuel. The first fuel tank 18 can be coupled via a first fuel line 20 and the second fuel tank 19 via a second fuel line 21 to the main pump 17, by a shuttle valve 22.

In the first operating mode, the shuttle valve 22 couples the first fuel tank 18 or the first fuel line 20 to the main pump 17 of the main injection system to feed the first fuel 18 to the cylinders 12 of the dual-fuel internal combustion engine 11. In this first operating mode, the shuttle valve 22 separates the second fuel tank 19 from the main pump 17 of the main injection system.

In contrast, in the second operating mode, the shuttle valve 22 assumes a switching position in which the second fuel tank 19 is coupled to the main pump 17 of the main injection system via the second fuel line 21, to feed the second fuel to the cylinders 12 of the dual-fuel internal combustion engine 11 in the second operating mode. In this second operating mode, the first fuel tank 18 is then separated from the main pump 17 of the main injection system.

As already explained, the first liquid fuel is relatively ignitable and the second liquid fuel relatively less-ignitable. In order to ignite the second liquid fuel in the second operating mode in the region of the respective cylinder 12, the dual-fuel internal combustion engine comprises the pilot injection system, which comprises at least one pilot injector 23 for each cylinder 12.

By the pilot injection system, the first liquid fuel for igniting the second liquid fuel can be fed to the cylinders 12 of the internal combustion engine in the second operating mode. Accordingly, the pilot injection system, in addition to the at least one pilot injector 23 for each cylinder 12, comprises a pilot pump 24 via which, in the second operating mode, the respective pilot injector 23 can be supplied with the first liquid fuel emanating from the first fuel tank 18. From the first fuel tank 18, a further fuel line 40 extends in the direction of the cylinders 12, wherein the pilot pump 24 is connected into this further fuel line 40.

As is evident from FIG. 2, in the case of the dual-fuel internal combustion engine 11, the main injection system and the pilot injection system are coupled, namely such that in the second operating mode, emanating from the pilot injection system, which comprises the at least one pilot injector 23 and the pilot pump 24 for each cylinder 12, the first liquid fuel can be fed to the respective main injector 16 of the main injection system, wherein the first liquid fuel in the second operating mode serves as working fluid and as barrier fluid in the region of the respective main injector 16. Thus, FIG. 2 shows a branch line 25 that branches off the pilot injection system upstream of the respective pilot injector 23 and leads to the respective main injector 16 of the main injection system of the respective cylinder 12 and opens into the main injection system in the region of the respective main injector 16. Seen in the delivery direction of the pilot injection system, the branch line 25 branches off the pilot injection system downstream of the pilot pump 24 and upstream of the respective pilot injector 23, in order to feed the first liquid fuel to the respective main injector 16 of the main injection system as working fluid and barrier fluid in the second operating mode.

In the second operating mode, a pressure is present in the respective branch line 25 leading from the pilot injection system to the main injection system which is greater than the pressure in the region of the respective main injector 16, preferentially by a defined pressure offset. In this manner, it is ensured in the second operating mode that the first liquid fuel can always be reliably fed to the respective main injector 16.

In FIG. 2, a pressure reducer 26 is integrated in the branch line 25 shown in the figure. The reducer 26 limits the pressure in the respective branch line 25 downstream of the pressure reducer 26 to a defined level.

The first liquid fuel, which is relatively highly ignitable, is preferentially a liquid fuel having a lubricity WSD between 100 μm and 300 μm, preferentially between 100 μm and 200 μm. The second liquid fuel, which is relatively less-ignitable, is preferentially a liquid fuel having a lubricity WSD between 300 μm and 820 μm, preferentially between 400 μm and 820 μm. The first liquid fuel is preferentially a diesel fuel. The second liquid fuel is preferentially ethanol or methanol.

In the dual-fuel internal combustion engine 11 which in both operating modes combusts a liquid fuel each, the first liquid fuel in the second operating mode serves on the one hand for igniting the second liquid fuel and on the other hand as working fluid and barrier fluid in the region of the respective main injector 16. Accordingly, main injector 16 and pilot injector 23 of the respective cylinder 12 utilize, in the second operating mode, the first liquid fuel on the one hand as ignition fluid, which is introduced into the respective cylinder 12 via the respective pilot injector 23, and on the other hand as working fluid and barrier fluid in the region of the main injector 16 of the respective cylinder 12.

FIG. 3 shows a schematic cross section through a main injector 16 of the dual-fuel internal combustion engine 11, which is designed in accordance with an aspect of the present invention.

The fuel injector 16 preferentially comprises a multi-part main body 27, a nozzle needle 28 and a control valve 29.

The nozzle needle 28 is movably guided in a needle guide 30 of the main body 27. The main body 27 defines a needle fuel chamber 31. This needle fuel chamber 31 can be coupled via orifices 32 to a combustion chamber 33 of the respective cylinder 12. In a position of the nozzle needle 28, it closes the orifices 32 while in a second position of the nozzle needle 28 it opens the orifices 32.

In the main body 27 a first line 34 is introduced. Via this first line 34, a fuel can be fed to the needle fuel chamber 31.

In the illustrated embodiment, which in the case of the main injector 16 is a dual-fuel injector of a dual-fuel internal combustion engine 11, the first, relatively highly ignitable fuel emanating from the first fuel tank 18 can be fed via the main pump 17 to the needle fuel chamber 31 of the main injector 16 in the first operating mode of the dual-fuel internal combustion engine 11 via the first line 34. In the second operating mode of the dual-fuel internal combustion engine 11, relatively less-ignitable fuel, emanating from the second fuel tank 19, can be fed via the main pump 17 to the needle fuel chamber 31 of the main injector 16 via the first line 34. As explained above, the shuttle valve 22 assumes the respective switching position in this regard.

In addition to the first line 34, a second line 35 is introduced into the main body 27, which is separate from the first line 34. By this second line 35 the first fuel can be fed on the one hand to the needle guide 30 and on the other hand to a control chamber 36 of the control valve 29 of the main injector 16, namely in the second operating mode of the dual-fuel internal combustion engine 11. Emanating from the pilot injection system, the first fuel can be fed via the branch line 25 shown in FIG. 2, which branches off the first fuel downstream of the pilot pump 24 and upstream of the pilot injector 23, in the direction of the main injector 16, namely in the direction of the second line 35 of the same. The first fuel, which is fed to the needle guide 30 via the second line 35 serves as barrier fluid there. That first fuel, which via the first line 35 is fed to the control chamber 36 of the control valve 29, serves as working fluid there. This fuel serving as working fluid can be fed to the control chamber 36 via a choke 37 leading to the control chamber 36.

As already explained above in connection with FIG. 2, the pressure in the branch line 25, and thus the pressure in the second line 35, is greater than the pressure in the first line 34. Accordingly, a particularly advantageous barrier effect can be provided via the barrier fluid in the region of the needle guide 30.

Accordingly, the fuel conducted in the fuel injector according to the invention via the second line 35 serves on the one hand as barrier fluid and on the other hand as working fluid. This makes possible a particularly simple construction of the fuel injector 16 and of a dual-fuel internal combustion engine 11 comprising the fuel injector 16. In the second operating mode, in which the second fuel is combusted in the cylinders 12, a simple separation between the second fuel to be combusted and the first fuel serving as barrier fluid and working fluid is possible.

According to FIG. 3, the needle guide 30 is positioned between the needle fuel chamber 31 and the control chamber 36 of the control valve 29.

Between the needle guide 30 and the control chamber 36 a spring chamber 38 is positioned, in which a spring 39 is received, which presses the nozzle needle 28 into the second position.

This applies in particular to the field of so-called large engines or large internal combustion engines whose cylinders have piston diameters of at least 140 mm, in particular of at least 175 mm. Such large internal combustion engines are for example marine engines. In the invention, these are embodied as dual-fuel internal combustion engines.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE LIST

10 Ship propulsion system
11 Dual-fuel internal combustion engine
12 Cylinder
13 Generator
14 Ship propeller
15 Fuel supply system
16 Main injector
17 Main pump
18 Fuel tank
19 Fuel tank
20 Fuel line
21 Fuel line
22 Shuttle valve
23 Pilot injector
24 Pilot pump
25 Branch line
26 Pressure reducer
27 Main body
28 Nozzle needle
29 Control valve
30 Needle guide
31 Needle fuel chamber
32 Orifice
33 Combustion chamber
34 Line
35 Line
36 Control chamber
37 Choke
38 Spring chamber
39 Spring
40 Fuel line

I claim:

1. A fuel injector (16) of a dual-fuel internal combustion engine (11), for feeding fuel to a combustion chamber (33) of a cylinder (12) of the dual-fuel internal combustion engine (11), comprising:
a main body (27) having a needle guide (30);
a nozzle needle (28) movably guidable in the needle guide (30);
a needle fuel chamber (31) defined by the main body (27), which, via a plurality of orifices (32), is coupleable to the combustion chamber (33) of the cylinder (12), wherein the orifices (32) are open in a first position of the nozzle needle (28) and closed in a second position of the nozzle needle (28);
a first line (34) arranged in the main body (27), the first line (34) being coupled to the needle fuel chamber (31), wherein via the first line (34) a fuel is introduceable into the needle fuel chamber (31); and wherein in the main body (27) a second line (35) that is separate from the first line (34) is introduced, which is coupled to the needle guide (30) and to a control chamber (36) of a control valve (29) of the fuel injector (16), wherein via the second line (25) a fuel is feedable by a first segment to the needle guide (30) as barrier fluid and by a second segment to the control chamber (36) as working fluid, wherein the control chamber (36) is upstream of the nozzle needle.

2. The fuel injector according to claim 1,
wherein the fuel injector is a dual-fuel injector,
wherein in a first operating mode of the dual-fuel internal combustion engine a first fuel, having a first ignitability, is feedable to each of the first line (34) and the second line (35),
wherein in a second operating mode of the dual-fuel internal combustion engine the first fuel is feedable to the second line (35) and a second fuel, having a second ignitability, less than the first ignitability, is feedable to the first line (34).

3. The fuel injector according to claim 2,
wherein the second line (35) is coupleable to the control chamber (36) of the control valve (29) via a choke (37).

4. The fuel injector according to claim 3,
wherein the needle guide (30) is positioned between the needle fuel chamber (31) and the control chamber (36) of the control valve (29).

5. The fuel injector according to claim 4,
wherein between the needle guide (30) and the control chamber (36) a spring chamber (38) is positioned, in which a spring (39) is received which presses the nozzle needle (28) into the second position.

6. A dual-fuel internal combustion engine (11), comprising:
a plurality of cylinders (12), in which in a first operating mode a first liquid fuel is combustible and in a second operating mode a second liquid fuel is combustible,
a main injection system comprising at least one fuel injector according to claim 1 as a main injector (16) for each of the plurality of cylinders (12), via which the first liquid fuel is feedable to the cylinders (12) in the first operating mode, and via which the second liquid fuel is feedable to the cylinders (12) in the second operating mode,
having a pilot injection system comprising at least one pilot injector (23) for each cylinder (12), via which the first liquid fuel for igniting the second liquid fuel is feedable to the cylinders (12) of the internal combustion engine in the second operating mode.

7. The dual-fuel internal combustion engine (11) according to claim 6,
wherein the main injection system and the pilot injection system are coupled such that in the second operating mode, the first liquid fuel, emanating from the pilot injection system, is feedable to the respective main injector (16) as working fluid and as barrier fluid.

8. The dual-fuel internal combustion engine (11) according to claim 7,
wherein upstream of the respective pilot injector (23) a respective branch line (25) branches off the pilot injection system and opens into the second line (35) of the respective main injector (16).

9. The dual-fuel internal combustion engine (11) according to claim 8,
wherein a pressure reducer (26) is integrated in the respective branch line (25) and is configured to limit the pressure in the respective branch line (25).

10. The dual-fuel internal combustion engine (11) according to claim 9,
wherein the main injection system comprises a main pump (17), via which the first liquid fuel is feedable to the cylinders (12) in the first operating mode, and via which the second liquid fuel is feedable to the cylinders (12) in the second operating mode,
wherein the pilot injection system comprises a pilot pump (24), via which the first liquid fuel for igniting the second liquid fuel is feedable to the cylinders (12) in the second operating mode,
wherein a shuttle valve (22), in the first operating mode, couples the main pump (17) to a first fuel tank (18) for the first fuel and in the second operating mode, the main pump (17) to the second fuel tank (18) for the second fuel.

* * * * *